United States Patent

Christiansen et al.

[11] 4,249,201
[45] Feb. 3, 1981

[54] COLOR DECODER FOR COLOR TELEVISION RECEIVER

[75] Inventors: Peter Christiansen; Gerhard Kohlbacher, both of Ulm, Fed. Rep. of Germany

[73] Assignee: Licentia Patent-Verwaltungs-G.m.b.H., Frankfurt am Main, Fed. Rep. of Germany

[21] Appl. No.: 78,445

[22] Filed: Sep. 24, 1979

[30] Foreign Application Priority Data

Sep. 23, 1978 [DE] Fed. Rep. of Germany ....... 2841542
Aug. 3, 1979 [DE] Fed. Rep. of Germany ....... 2931557

[51] Int. Cl.³ .................. H04N 9/50; H04N 9/535
[52] U.S. Cl. .................................... 358/24; 358/23
[58] Field of Search ............... 358/24, 23; 329/50

[56] References Cited

U.S. PATENT DOCUMENTS

| | | | |
|---|---|---|---|
| 3,558,810 | 1/1971 | Cecchin | 358/23 |
| 3,840,697 | 10/1974 | Lunn | 358/23 |
| 3,887,938 | 6/1975 | Cecchin | 358/23 |

FOREIGN PATENT DOCUMENTS 2626231 1/1977 Fed. Rep. of Germany ........... 358/23

OTHER PUBLICATIONS

"RGB Colour Decoder with Three ICs," Anon., Mullard Outlook No. 4, pp. 5–8, Jul.–Aug. 74.
"A Pal–Decoder with only 2 ICs," Reimann, Radio Mentor Electronic, vol. 41, No. 8, pp. 314–315, Aug. 1975.

Primary Examiner—Howard W. Britton
Assistant Examiner—Michael Allen Masinick
Attorney, Agent, or Firm—Spencer & Kaye

[57] ABSTRACT

In a color decoder for a color television receiver, including a demodulator for demodulating a modulated chrominance subcarrier to obtain color signals, delay lines in the form of a charge storage and transfer circuit for delaying the color signals by one picture line scanning period, and adder stages forming a matrix connected to produce color difference signals from the delayed and the undelayed color signals, the demodulator and the adder stages are constituted by integrated charge storage and transfer circuits on a semiconductor chip.

16 Claims, 9 Drawing Figures

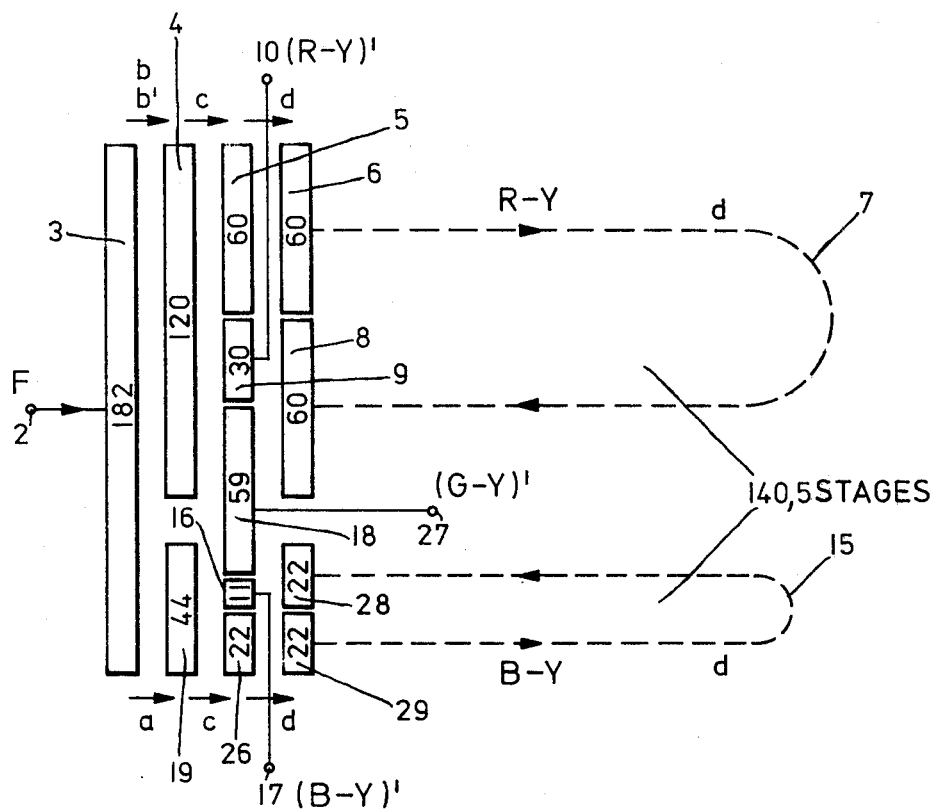
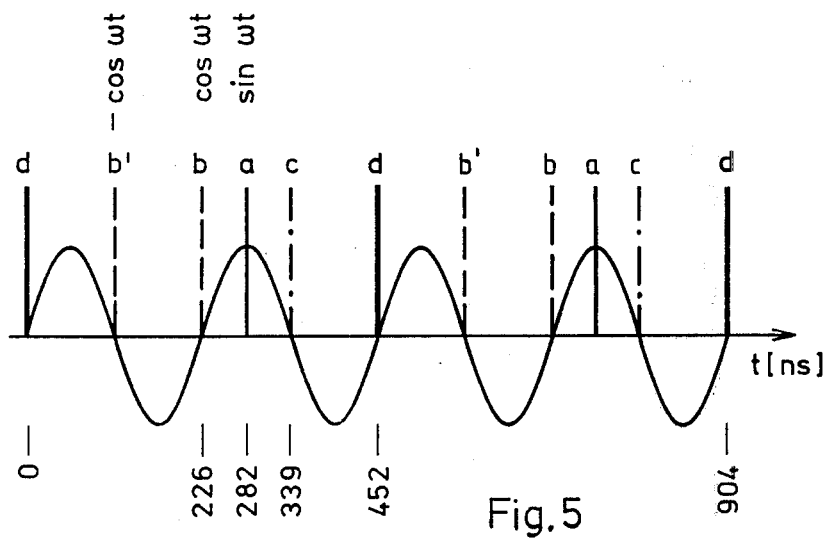
Fig.4
Fig.5

COLOR DECODER FOR COLOR TELEVISION RECEIVER

BACKGROUND OF THE INVENTION

The present invention relates to a color decoder for a color television receiver of the type in which the color signals obtained in demodulators from the modulated chrominance subcarrier are obtained with a delay of one picture line period in delay lines designed as charge transfer circuits and the color difference signals are obtained from the delayed and the undelayed signals in adder stages which act as a matrix, the delay lines, the demodulators and the adder stages being constructed as integrated circuits on a semiconductor chip.

In order to demodulate the PAL chrominance subcarrier it is known to delay the chrominance subcarrier by one picture line period in a glass ultrasound delay line and to add, to the delayed chrominance subcarrier in successive adder stages, the undelayed chrominance subcarrier and the undelayed chrominance subcarrier which has been shifted in phase by 180°, respectively. This produces a split of the signal into the two carrier frequency components (R-Y) and (B-Y). The (B-Y) component is demodulated in a first demodulator with the use of a reference carrier generated by a reference carrier oscillator and the (R-Y) component, whose phase alternates from line to line by 180°, is demodulated in a second demodulator with the use of a reference carrier which has been shifted by 90° and is switched by 180° from line to line. In this way the two video frequency color difference signals (B-Y)' and and (R-Y)' are produced which constitute an average over two lines. This manner of decoding has the drawback that a glass delay line is required which cannot be integrated in modern semiconductor circuits.

The periodical Funk-Technik, 1971, No. 6, at pages 195-198, discloses the use of two bucket brigade circuits in the PAL decoder instead of a glass delay line. Since the bucket brigade circuits have the characteristic of a lowpass filter, they can be used only to delay video frequency signals. For that reason, the known decoder splits the chrominance subcarrier by means of two synchronous demodulators into the two video frequency signals (B-Y) and (R-Y). These signals are then delayed by one picture line period in a delay line designed as a shift register for analog signals. By adding the two undelayed signals to the correponding delayed signals, the two color difference signals (B-Y)' and (R-Y)' are generated in an adder stage. Thereafter the two color difference signals (B-Y)' and (R-Y)' are fed, in a given ratio, to a further adder stage serving as matrix which generates the color difference signal (G-Y)' therefrom. This decoder has the drawback that it requires a large number of structural components.

SUMMARY OF THE INVENTION

It is an object of the present invention to provide a color decoder for a color television receiver which is fully integratable and operates with as little energy consumption as possible.

This and other objects are achieved, according to the invention, in a decoder of the type described at the outset, by also constructing the demodulators and the adder stages as charge transfer circuits.

The present invention is based on the realization that the principles of a charge transfer circuit which generally serves only to delay signals can also be used in a color decoder for the establishment of demodulators and adder stages. This brings the advantage that the components, such as the delay lines, the demodulators and the adder stages which are essential for the color decoder, can all be fabricated according to the same circuit technique. This substantially simplifies the manufacture of such a decoder as an integrated circuit (IC) on a single semiconductor chip. Since the same switching technique is then used for all of these stages, the IC can be produced in a technically particularly advantageous manner. Furthermore, since the circuit components consume only little energy, further components such as amplifiers, pulse shapers, frequency converters and/or inverters can be accommodated on the same semiconductor chip, which is advantageously fabricated according to the MOS technique. Thus only very few external leads are required for such an integrated module. The decoder according to the invention can be used to decode a PAL chrominance subcarrier as well as a SECAM chrominance subcarrier.

The decoder can advantageously be designed as a charge transfer circuit in that it forms a single unit. The charge-coupled device (CCD) technique is particularly suitable for this purpose. By specially designing the input electrode of this charge transfer circuit, it can be used not only to sample signals, as it is done in the present invention in the synchronous demodulator, but also for the unweighted and weighted addition of input signals.

If, for example, the input electrode is divided into two equally sized electrodes, such an adder stage is suitable to add an undelayed and a delayed signal. If a delay line is connected ahead of the stage, it can then produce, for example, from the signal (B-Y) a phase averaged color difference signal (B-Y)'. If, on the other hand, the input electrode is divided according to the ratios of the color difference signals in the gray signal, such a charge transfer circuit can be used as an adder stage acting as a matrix to generate the signal (G-Y) from the signals (B-Y) and (R-Y). Such adder stages and synchronous demodulators have only a few clock pulse electrodes. Since, except for the input electrode, they are identical in design to the CCD delay lines, this module can be produced simply and thus economically.

When the adder stage constituting a matrix is constructed with the lengths of the divided input electrodes in a ratio of 11/59 to 30/59 and their spacing 18/59 of the length of the remaining clock pulse electrodes of that stage, this adder stage is capable of bringing the color difference signals together in the standard ratio in order to form the color difference signal (G-Y)'.

The chrominance subcarrier frequency of a color television receiver lies at about 4 MHz and the upper limit frequency of the video frequency color signal lies at 1 MHz. According to the sampling theorem it is therefore possible to select twice the upper limit frequency of the signal to be sampled as the sampling frequency. The decoder according to the present invention utilizes this possibility in that one-half the chrominance subcarrier frequency is utilized in an advantageous manner as the sampling frequency for the charge transfer circuit. Without any loss in quality, this sampling frequency reduction has the advantage of noticeably reducing energy consumption in the charge transfer circuit and, as a result of the reduced energy loss, permits higher component density on the semiconductor chip.

BRIEF DESCRIPTION OF THE DRAWINGS

FIG. 4 is a view similar to that of FIG. 2 showing an embodiment of a modified decoder according to the present invention in which a particularly short travel time is realized in the color decoder.

FIG. 5 is a signal diagram illustrating the operation of the decoder of FIG. 4.

DESCRIPTION OF THE PREFERRED EMBODIMENTS

Figure 1:
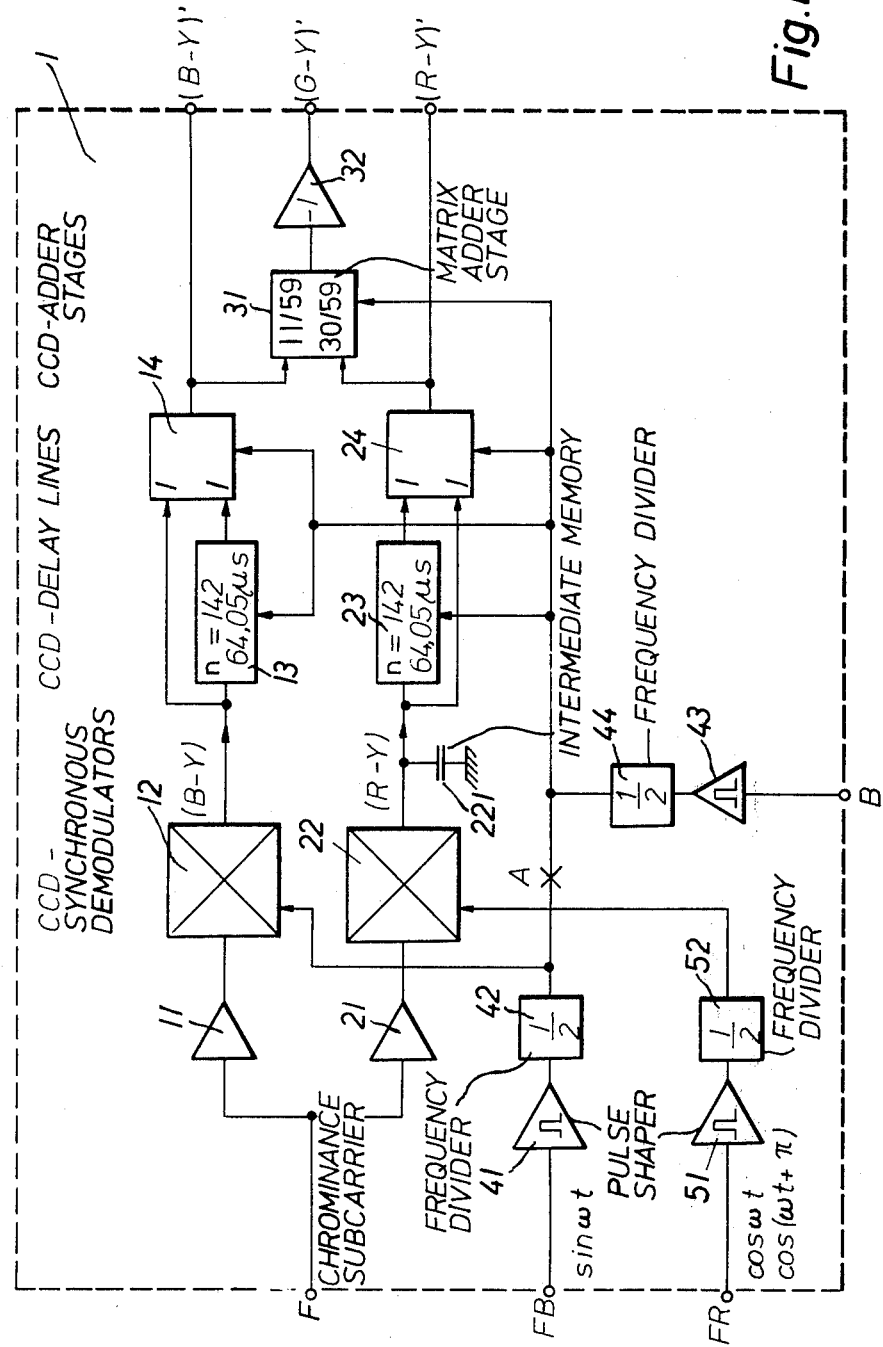
FIG. 1 is a block circuit diagram of a preferred embodiment of a decoder according to the present invention.

In FIG. 1 all circuit components shown within broken-line box 1 are disposed on a single semiconductor chip, for example on a silicon substrate of p-type conductivity. The components are all fabricated according to MOS technique.

The decoder serves to generate the color difference signals (B-Y)', (R-Y)' and (G-Y)' from a received modulated chrominance subcarrier F. The chrominance subcarrier F is demodulated in two synchronous demodulators 12 and 22, each having an associated amplifier 11 or 21, respectively, connected ahead of it, so as to produce the two video frequency color signals (B-Y) and (R-Y). Each one of the two color signals is then delayed in a delay line 13 or 23, respectively, by one picture line period, i.e., by about 64 µs. The two undelayed color signals are added to respective corresponding delayed signals in respective adder stages 14 and 24, so that, as the result of this addition, the two color difference signals (B-Y)' and (R-Y)' can be obtained at the outputs of the adder stages 14 and 24, respectively. Those two color difference signals are fed to an adder stage 31 which constitutes a matrix and which adds the two color difference signals weighted according to the color television standard and thus generates at its output the color difference signal (G-Y)'. An inverter 32 then produces the color difference signal (G-Y)' of the correct polarity.

The synchronous demodulators 12 and 22, the delay lines 13 and 23, the adder stages 14 and 24 and the adder stage 31 which serves as a matrix are constructed as a charge transfer circuit. The charge transfer clock pulses are obtained from the reference carrier generated in the receiver.

When the decoder is used as a PAL decoder, the input FB receives the locally generated reference carrier at a frequency of 4.43361875 MHz to generate the color difference signal (B-Y). Since the (R-Y) component of the chrominance subcarrier is shifted by 180° from line to line, a further input FR is provided which receives the reference carrier shifted in phase by 90° and switched in phase from line to line by 180°. Pulse shapers 41 and 51 generate a pulse from each period of the respective reference carrier. The number of these pulses per unit time is divided in half in a frequency divider 42 or 52, respectively. Consequently, the resulting pulses have a repetition rate equal to half the chrominance subcarrier frequency.

The pulse sequence of the reference carrier which is not switched in phase, hereinafter called the first pulse sequence, is used to sample the modulated chrominance subcarrier in the CCD synchronous demodulator 12. This sampling produces the color signal (B-Y) at the output of the synchronous demodulator 12.

The pulse sequence of the reference carrier which is switched in phase, hereinafter called the second pulse sequence, has phase shifts of 90° or 270°, respectively, relative to the first pulse sequence for the duration of one picture line period and thus samples in synchronous demodulator 22 the (R-Y) component of the modulated chrominance subcarrier. In order to be able to use the same pulse sequence for the charge transfer during the further signal processing, an intermediate memory 221, which can be in the form of a capacitor, is provided between the synchronous demodulator 22 and the delay line 23. Memory 221 stores the signal emitted at the output of the synchronous demodulator 22 for the duration of about one µs so that the first pulse sequence can be used as a clock pulse for reading the signal amplitudes into the input of the delay line 22 and the inputs of the adder stage 24. For this purpose it is advisable to design the output of the synchronous demodulator 22 as a source follower. All subsequent charge transfer circuits 23, 24 and 31 can be operated with the clock pulse provided by the first pulse sequence.

To delay the signals by one picture line period, the delay lines 13, 23 must have 142 stages in view of the sampling frequency $f_A = F/2$, where F = chrominance subcarrier frequency. The fabrication of such delay lines as CCD shift registers is described, for example, in the Journal of Vac. Sci. Technol. Volume 9, No. 4, (1972) at pages 1166-1181.

According to one embodiment of the invention, the adder stages 14, 24 and 31 have divided input electrodes whose dividing ratios correspond to the signal weighting of the signals to be added.

Figure 2:
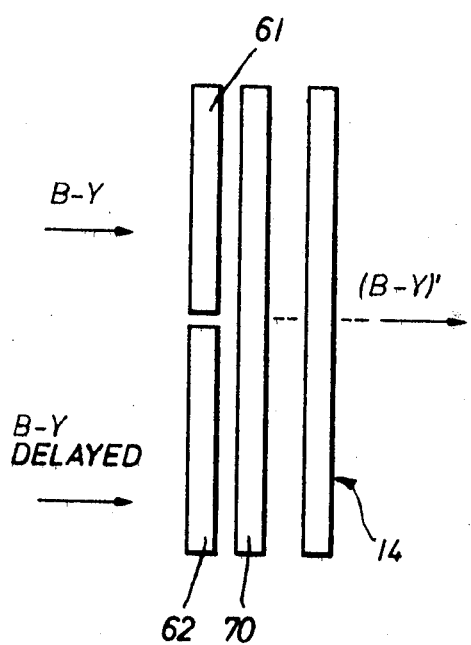
FIG. 2 is a pictorial representation of the dimensions of the electrodes of a CCD adder stage according to the invention for identically weighted summands.

As shown in FIG. 2, which depicts an embodiment of adder stage 14, the input electrodes of the adder stages 14 and 24 are divided into two electrodes 61 and 62 of equal size while the subsequent clock pulse electrode 70 and the ones thereafter are undivided and thus take on the sum of the charges emitted from the input electrodes.

Figure 3:
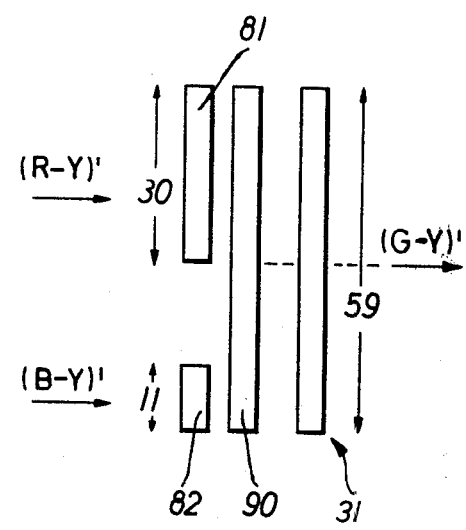
FIG. 3 is a view similar to that of FIG. 2 showing the dimensions of the electrodes of a CCD adder stage according to the invention constituting a matrix for unequally weighted summands.

The adder stage 31 which serves as a matrix must add the color difference signals (B-Y)' and (R-Y)' in a ratio of 11:30 and reduce the sum signal to 41/59 of the actual sum value. According to the present invention, this is accomplished in that, as shown in FIG. 3, the input electrode of the adder stage 31 is divided into two parts 81 and 82. The one part, 82, which receives the (B-Y)' signal, is 11/59 of the length of a clock pulse electrode 90 of the adder stage 31 and the other part, 81, which receives the (R-Y)' signal, is 30/59 of that length.

This technique of divided electrodes can also be used to advantage at the output of the CCD circuits. If the output electrode of the synchronous demodulator 12 is divided into two equal parts, the one part is connected directly with the one divided input electrode of adder stage 14 and the other part is connected directly with the input electrode of the delay line 13.

If the output electrode of adder stage 14 is divided into two parts, the color difference signal (B-Y)' can be conducted from the one part directly to the output of module 1 and the other part may be part of the input electrodes of the adder stage 31. This applies correspondingly for coupling the adder stage 24 to the adder stage 31. It can thus be seen that the charge transfer circuits of the decoder shown in FIG. 1 can be designed as a unit and can thus be integrated in a space saving manner.

The described decoder can also be designed as a SECAM decoder. For this purpose, the modulated SECAM chrominance subcarrier is fed to input F of the circuit of FIG. 1 and the chrominance subcarrier alternating from line to line is fed in common to both inputs FB and FR. Moreover, at the output of the circuit 42 for effecting a frequency division of 1:2 the line must be severed at point A and half of the sampling frequency obtained from the chrominance subcarrier must be fed as transfer pulse to the delay lines 13 and the adder stages 14, 24, 31. The pulse shaper 43 required for this purpose and the frequency divider 44 having a dividing ratio of 1:2 can also be integrated on the semi-conductor chip 1 as shown in FIG. 1 so that a continuous chrominance subcarrier frequency can be fed to input B.

When the line is severed at point A, the decoder must be controlled via terminals F, FB, FR and B for SECAM operation, while for PAL operation, control is effected via terminals F, FB and FR and terminal B must then be connected with terminal FB.

Due to the design of the adder stage 31 as a charge transfer circuit, the signal (G-Y)' which has been produced by additional summing has a slight phase shift with respect to the other two color difference signals. According to a further feature of the present invention, therefore, the clock pulse lines of the adders 14 and 24 are increased by the same number of clock pulse lines as are present in the adder stage 31 so that the terminals for the inputs of the adder stage 31 form taps for the adder stages 14, 24. Phase shifts between the color difference signals emitted by the decoder are thus avoided.

In the above-described decoder there may occur the following drawback. It is known that in a color television receiver the chrominance channel is narrower banded than the luminance channel. That means that the travel time of the signal in the chrominance channel is longer than the travel time of a signal in the luminance channel. Since the signals from the chrominance channel and the signals from the luminance channel must coincide again in their correct time position no later than at the picture tube, an additional delay must be provided in the path of the luminance channel in a color television receiver. In practice this is usually accomplished by means of a delay line composed of an inductance in the longitudinal, or series, path with distributed transverse, or shunt, capacitances. Such a delay line is described, for example, in German Pat. No. 1,204,349. The period of delay in the luminance channel to compensate for the longer travel time of the signals in the chrominance channel presently is of the order of magnitude of 500 ns.

If now the demodulation and the addition are effected in the color decoder by means of a charge transfer, additional time is required for this charge transfer. That means initially that the delay time effective in the path of the color decoder is increased with respect to conventional color decoders. For that reason the delay provided in the path of the luminance signal should also be increased accordingly.

FIGS. 4–9 depict an embodiment of a decoder in which the occurring delay is kept as small as possible. This embodiment presents a particularly advantageous arrangement of the electrodes with respect to one another, particularly with respect to the demodulator and adder functions, which causes the delay of the signal occurring during these operations to be kept to a minimum. The signal thus goes as quickly as possible, once directly and once delayed by one line scanning period, to the point where in the end the color difference signals are formed to control the picture tube. The delay by one line scanning period remains in effect since it is desirable for the average formation in a PAL decoder.

In FIG. 4 the rectangles constitute electrodes on a semiconductor chip below which there are the charge storage regions and between which the charges are transferred. The numerals appearing in the rectangles indicate the relative lengths of these electrodes. The lower case letters a, b, c and d in FIGS. 4 and 5 indicate the occurrences of charge transfers. In FIG. 5 the time sequence of these occurrences, in nanoseconds, is shown in relation to a sine wave representing the unmodulated chrominance subcarrier, i.e. the locally generated reference carrier with constant frequency and phase. This is the standard chrominance subcarrier frequency of 4.43316875 MHz, which has a chrominance subcarrier period of about 226 ns.

With the aid of FIGS. 4 and 5, the individual functions of the PAL decoder, utilizing charge transfer, will be described below.

1. (R-Y) Demodulation

The modulated chrominance subcarrier F travels from terminal 2 to electrode 3. At the instant b, which corresponds to the positive maximum of the function $\cos \omega t$, the stored charge is transferred from the electrode 3 to the electrode 4, as shown by the arrow b in FIGS. 4 and 5. Since this practically corresponds to sampling of the modulated chrominance subcarrier at a certain point in time, this results in a synchronous demodulation toward the axis R-Y. Thus charges whose value corresponds to the value of the (R-Y) signal are produced under electrode 4. This charge transfer is effected, according to FIG. 5, at equispaced time intervals, i.e. each time at instant b. As can be seen, only every other chrominance subcarrier period is sampled in this manner. That is sufficient because the chrominance subcarrier frequency is 4.4 MHz while the limit frequency of the color signals is only about 1 MHz.

2. Coupling in the Delay Line

At each instant c, one half of the charge present under electrode 4 is transferred to electrode 5. This electrode 5 simultaneously forms the input electrode of the delay line. The electrode 5 is followed by a plurality of further identical electrodes 6, only one of which is shown, which are arranged along a path 7. The reversal of the charge transfer direction at the right-hand end of the path 7 can be realized on the semiconductor chip by suitable arrangement of the electrodes 6 or by a deflection diffusion.

The electrode 8 is the last electrode of the delay line for one line sweep formed of a plurality of electrodes 6 along the path 7. Thus the demodulated current (R-Y) signal is present now at electrode 4 and the demodulated (R-Y) signal delayed by one picture line scanning period is present at electrode 8. The charge transfer from one electrode to the next on path 7, i.e. seen as a whole from electrode 6 to electrode 8 is effected each time at instant d and, for example in two-phase operation, at d+226 ns. The number of stages is selected accordingly so that the desired delay by one line scanning period is realized.

3. Averaging the undelayed and the delayed (R-Y) signals

Electrode 9 is disposed between electrodes 4 and 8. By means of a clock pulse applied between the individual electrodes, ¼ of the charge on electrode 4, i.e. the undelayed (R-Y) signal, now moves to electrode 9. On the other hand, half of the charge on electrode 8, i.e. the (R-Y) signal delayed by one line scanning period, moves to electrode 9 in response to the applied clock pulse. Thus PAL averaging between the undelayed and the delayed (R-Y) signal takes place at the electrode 9 so that the signal (R-Y)' averaged over two lines is available at terminal 10.

4. Consideration of the PA1 Switch

It is known that the (R-Y) axis of the chrominance subcarrier F at terminal 2 is switched by 180° from line to line. This fact must be considered in the synchronous demodulation. For that reason, during every other picture line scanning period, the charge transfer b now takes place 180° offset with respect to the chrominance subcarrier period, as shown in FIGS. 4 and 5 at b'. The points in time of the charge transfers are thus switched from line to line between b and b'. The period of time between the charge transfer b and the subsequent charge transfer c is thus of a different length from line to line.

5. (B-Y) Demodulation

The demodulation of the chrominance subcarrier F at terminal 2 in the form of the charge under electrode 3 is effected by a charge transfer at time a, i.e. corresponding to the quadrature modulation of the chrominance subcarrier offset in phase by 90°, with respect to the chrominance subcarrier frequency, from each instant b. That corresponds to a synchronous demodulation of the modulated chrominance subcarrier toward the axis (B-Y). Further transfers take place at instants c and d to electrode 26 and the first of a plurality of electrodes 29, respectively, in a manner similar to that described above. The other events are comparable with the (R-Y) demodulation. The demodulated (B-Y) signal moves correspondingly along delay path 15. The electrode design is thus symmetrical for signals R-Y and B-Y, only the lengths of the electrodes are different to correspond to the amplitude value of these signals as shown. For the (B-Y) demodulation, the PAL switch need not be considered since the (B-Y) axis is constant. For that reason the charge transfer a always takes place at the same time relative to the chrominance subcarrier period. In the same manner as the average (R-Y) signal is produced at electrode 9, the signal (B-Y)' averaged over two lines appears at electrode 16, and can then be obtained at terminal 17.

6. Generation of the (G-Y)' signal

In prior art circuits the (G-Y)' signal would be obtained by matrixing from the signals at terminals 10 and 17 in FIG. 4. In contrast, in the decoder of FIG. 4 the (G-Y)' signal is produced at the electrode 18. This electrode receives, at its top and from the left, the undelayed signal (R-Y) from electrode 4, at its top and from the right, the delayed signal (R-Y) from electrode 8, at its bottom and from the left, the undelayed signal (B-Y) from electrode 19, and at its bottom and from the right, the delayed signal (B-Y) from the last electrode 28 of the delay line 15. In contradistinction to the prior art, the signal (G-Y)' is thus generated according to the following equation:

$$(G - Y)' = \\ -\left[ \frac{30}{59} \cdot \tfrac{1}{2} \cdot (R - Y)^*_{n+1} + \frac{30}{59} \cdot \tfrac{1}{2} \cdot (R - Y)^*_n \right. \\ \left. + \frac{11}{59} \cdot \tfrac{1}{2} \cdot (B - Y)^*_{n+1} + \frac{11}{59} \cdot \tfrac{1}{2} \cdot (B - Y)^*_n \right]$$

The given amplitudes are determined by the length dimensions of the individual electrodes indicated in FIG. 4.

Figure 6:
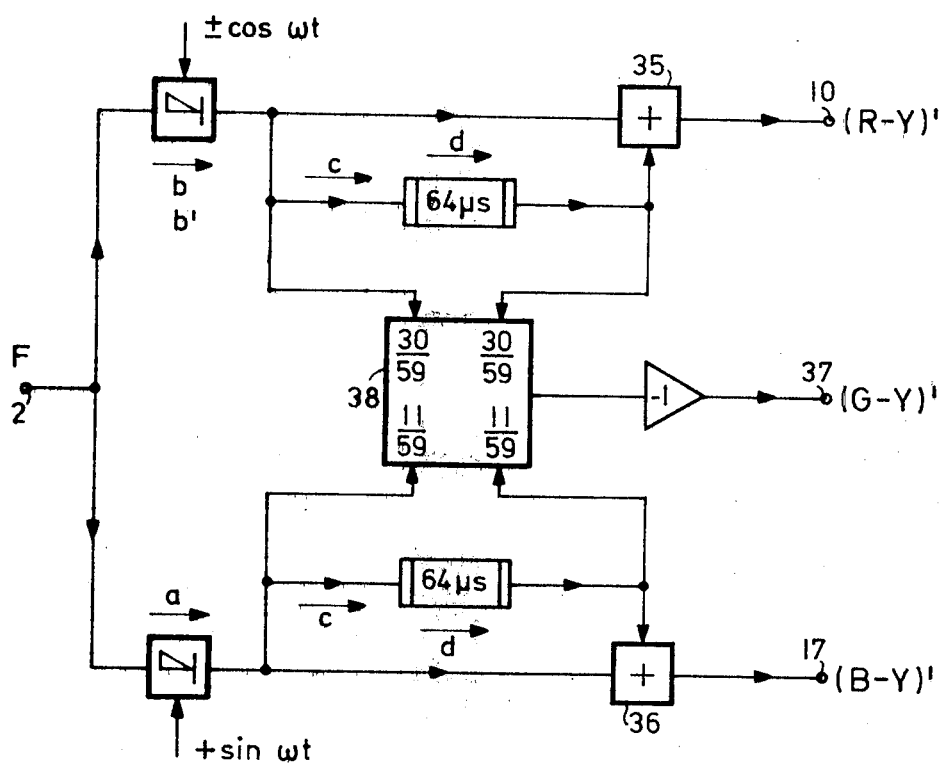
FIG. 6 is a circuit diagram of an embodiment of an adder stage according to the invention for obtaining the signal (G-Y)'.

FIG. 6 shows a block circuit diagram for the decoder of FIG. 4 and particularly the novel manner of generating the (G-Y)' signal. The association of the charge transfers of FIG. 4 with the block circuit diagram of FIG. 6 are again indicated by the arrows a, b, b', c and d. The adder stage 35 corresponds to the electrode 9 in FIG. 4 and the adder stage 36 corresponds to the electrode 16 in FIG. 4. It is clear that the (G-Y)' signal is obtained from a total of four signals, i.e. the input signal and the output signal of each of the two delay lines. This is indicated by the adder stage 38 whose four inputs have been given the corresponding amplitude values. The four inputs are thus formed by the electrodes 4, 8, 19 and 28 and the output is formed by electrode 18 of FIG. 4.

It can be seen that with the electrode arrangement of FIG. 4 the charges are transferred as quickly as possible without unnecessary detours or delays. The charges are thus transferred with the least possible delay to the next electrode to obtain in this way the three signals (R-Y)', (B-Y)' and (G-Y)' with the least possible delay.

Figure 7:
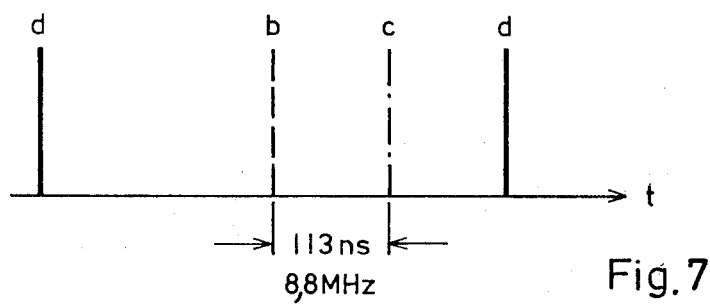
FIGS. 7, 8 and 9 are signal diagrams illustrating the different clock pulses during charge transfer, and the resulting clock pulse frequencies, in the operation of the embodiment of FIG. 4.

FIG. 7 shows a portion of FIG. 5, i.e. the charge transfers for the (R-Y) demodulation for the case b corresponding to $+\cos \omega t$. The maximum delay period occurring in the signal path between the charge transfer for synchronous demodulation and the charge transfer into the delay line is here 113 ns. That corresponds to a clock pulse frequency of 8.8 MHz. The clock pulse d for the delay by one line scanning period has a rate of 2.2 MHz. The illustrated letters b, c, d again correspond to the charge transfers between the electrodes as shown in FIG. 4.

Figure 8:
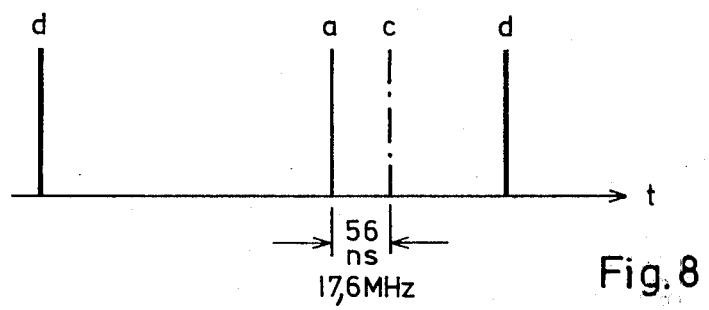

FIG. 8 shows a portion of FIG. 5 for the charge transfers for the (B-Y) demodulation. The maximum delay here is only 56 ns, which corresponds to a clock pulse frequency of 17.6 MHz. The charges which are transferred at different points in time b and a, are thus forwarded at the same point in time c. If the clock pulse frequency of 17.6 MHz is realizable in practice, the charge actually remains unnecessarily long under one electrode between times b and c.

Figure 9:
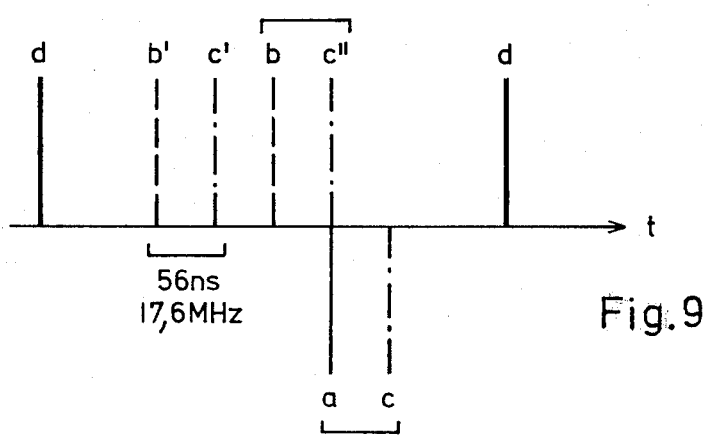

FIG. 9 shows a clock pulse sequence for a charge transfer in which each transferred charge is individually forwarded as quickly as possible at the clock pulse frequency of 17.6 MHz. As a whole, charge transfers a, b, b' occur in the circuit of FIGS. 4 and 5 during synchronous demodulation at three different times. In FIG. 7, 8 the charge transfers c subsequent to these three charge transfers at different times was effected always at the same time relative to the chrominance subcarrier period. In FIG. 9, the last-mentioned charge transfer c is effected individually directly after each one of the individual charge transfers b', b and a after an interval of 56 ns. The brackets indicate the relationships between the two charge transfers. The charge transfer at time b' in FIG. 5 from electrode 3 to electrode 4 is thus not transferred to electrode 5 at time c as in FIG. 5 but already at time c' directly after the charge transfer b', insofar as the level of the then occurring clock pulse frequencies permits this.

Due to the summing of the signals associated with a picture line n and a picture line n+1 which has precisely one delaying clock pulse spacing the actual delay line has now only a length of 140.5 stages instead of 141.5. Added to this is, in the minimal case, ¼ delaying clock pulse, i.e., the distance from d to c, i.e., for example the charge transfer from electrode 5 to electrode 6. This results in a total delay of $$\frac{141.75 \cdot 1}{\frac{1}{2} \cdot 4.43317 \text{ MHz}} = 63.949 \ \mu s.$$

It will be understood that the above description of the present invention is susceptible to various modifications, changes and adaptations, and the same are intended to be comprehended within the meaning and range of equivalents of the appended claims.

What is claimed is:

1. In a color decoder for a color television receiver, including demodulator means for demodulating a modulated chrominance subcarrier to obtain color signals, delay lines in the form of a charge storage and transfer circuit for delaying the color signals by one picture line scanning period, and adder stages forming a matrix connected to produce color difference signals from the delayed and the undelayed color signals, the demodulator means and the adder stages being constituted by integrated circuits on a semiconductor chip, the improvement wherein said demodulator means and said adder stages comprise charge storage and transfer circuits.

2. Decoder as defined in claim 1 wherein said charge storage and transfer circuits are CCD devices and said adder stages include two first adder stages each having divided input electrodes of equal size connected to receive respective undelayed and delayed color signals in the same ratio and a third adder stage having two input electrodes connected to receive the output signals from said first adder stages in a given ratio, the relative sizes of said input electrodes of said third adder stage corresponding to the given ratio.

3. Decoder as defined in claim 2 wherein said third adder stage has an elongate clock pulse electrode, said two input electrodes are adjacent, and parallel to, said clock pulse electrode, and, in the direction of the long dimension of said clock pulse elctrode, said input electrode of said third adder stage have respective lengths of 11/59 and 30/59 of the length of said clock pulse electrode, and are spaced apart by a spacing of 18/59 of the length of said clock pulse electrode.

4. Decoder as defined in claim 1 wherein the sampling frequency of said charge storage and transfer circuits is one-half the chrominance subcarrier frequency.

5. Decoder as defined in claim 1 wherein said demodulator means include an output electrode, one of said delay lines includes an output electrode, and one of said adder stages includes an output electrode interposed between said output electrodes of said one of said delay lines and of said demodulator means.

6. Decoder as defined in claim 5 wherein said one of said delay lines comprises a plurality of electrodes including an input electrode and said output electrode, arranged along a path whose output end returns in the direction toward its input end so that said input and output electrodes of said one delay line are disposed in close juxtaposition to one another.

7. Decoder as defined in claim 5 wherein there are three of said adder stages having respective output electrodes, and said output electrodes of said three adder stages are aligned in a row.

8. Decoder as defined in claim 7 wherein said output electrode of one said adder stage lies between said output electrodes of the other two of said adder stages.

9. Decoder as defined in claim 5 wherein there are two said delay lines each connected to receive a respective color signal and one of said adder stages is connected to produce a respective color difference signal by addition of the four signals at the inputs and outputs of said two delay lines.

10. Decoder as defined in claim 9 wherein said demodulator means includes two said output electrodes each providing a different color signal, there are two of said delay lines each including an output electrode, a second one of said adder stages includes an output electrode, and said output electrode of said second adder stage is bordered along two opposite sides by parts of said two output electrodes, said demodulator means and of said output electrodes of said two delay lines.

11. Decoder as defined in claim 5 wherein said demodulator means include an input electrode for receiving the modulated chrominance subcarrier, said one delay line includes an input electrode, and said input electrodes and said output electrode of said demodulator means are disposed in sequence immediately adjacent one another.

12. Decoder as defined in claim 11 wherein said demodulator means comprise two demodulator units each having a respective output electrode and each obtaining a respectively different color signal, and further comprising clock pulse applying means operatively associated with said demodulator units for effecting charge transfer from said demodulator means input electrode to said output electrode of each said unit such that each transfer in one said unit occurs at a moment shifted in phase by 90° of a chrominance subcarrier cycle relative to the moment of a related transfer in the other said unit, and transfer in one said unit is shifted in phase with respect to the chrominance subcarrier by 180° from one picture line scanning period to the next.

13. Decoder as defined in claim 12 wherein there are two said delay lines each including a respective input electrode and said clock pulse applying means are operatively associated therewith for effecting a charge transfer from said output electrode of each said unit to said input electrode of a respective delay line simultaneously at a moment after charge transfer has occurred between said demodulator means input electrode and each said first output electrode.

14. Decoder as defined in claim 11, further comprising clock pulse applying means operatively associated with said input and output electrodes of said demodulator means and said input electrode of said one delay line for effecting a first charge transfer between said demodulator means input and output electrodes and a second charge transfer from said demodulator means output electrode to said delay line input electrode, said second charge transfer following said first charge transfer by an interval approximately equal to an integral multiple of one-quarter of the period of a chrominance subcarrier cycle, where such integral has a value equal to or greater than one.

15. Decoder as defined in claim 11 wherein said demodulator means comprise two demodulator units each having a respective output electrode and each obtaining a respectively different color signal, and there are two said delay lines each including a respective input electrode and further comprising clock pulse applying means operatively associated with said demodulator units and said delay lines for effecting charge transfer from said demodulator means input electrode to said output electrode of each said unit such that each transfer in one said unit occurs at a moment shifted in phase by 90° of a chrominance subcarrier cycle relative to the moment of a related transfer in the other said unit, and transfer in one said unit is shifted in phase with respect to the chrominance subcarrier by 180° from one picture line scanning period to the next, and for effecting a charge transfer from said output electrode of each said unit to said input electrode of a respective delay line in the shortest time possible after charge transfer has occurred between said demodulator means input electrode and that said output electrode.

16. Decoder as defined in claim 15 wherein the time between each transfer to said output electrode of each said unit and subsequent transfer from that said output electrode is approximately one-quarter of the period of a chrominance subcarrier cycle.

* * * * *